United States Patent
Ababri et al.

(10) Patent No.: US 12,546,844 B2
(45) Date of Patent: Feb. 10, 2026

(54) SYSTEM AND METHOD FOR GEOLOCATION IDENTIFICATION AND ACCURACY ASSESSMENT OF FIXED WIRELESS CPE ENDPOINTS

(71) Applicant: VERIZON PATENT AND LICENSING INC., Basking Ridge, NJ (US)

(72) Inventors: Zainab Ababri, Dallas, TX (US); Rajender R. Nednur, Alpharetta, GA (US); Ratul K. Guha, Warwick, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 454 days.

(21) Appl. No.: 18/324,972

(22) Filed: May 27, 2023

(65) Prior Publication Data

US 2024/0393419 A1 Nov. 28, 2024

(51) Int. Cl.
*G01S 1/24* (2006.01)
*G01S 19/01* (2010.01)
(Continued)

(52) U.S. Cl.
CPC ............... *G01S 1/24* (2013.01); *G01S 19/01* (2013.01); *G01S 19/396* (2019.08); *H04W 64/003* (2013.01)

(58) Field of Classification Search
CPC .......... G01S 1/24; G01S 19/01; G01S 19/396; G01S 5/0036; G01S 5/14; G01S 5/0027; G01S 5/0244; H04W 64/003; H04W 64/00; H04W 72/23; H04W 72/1268; H04W 72/02; H04W 84/042; H04W 72/20; H04W 84/045; H04W 88/10; H04W 52/245; H04W 52/283; H04W 48/18; H04W 28/16; H04W 4/029; H04W 84/005; H04W 8/005; H04W 4/02; H04W 4/70; H04W 72/54;
(Continued)

(56) References Cited

U.S. PATENT DOCUMENTS

| | | | |
|---|---|---|---|
| 2008/0108366 A1* | 5/2008 | Hu | H04W 72/20 455/452.1 |
| 2010/0189096 A1* | 7/2010 | Flynn | H04L 67/63 370/352 |

(Continued)

*Primary Examiner* — Nimesh Patel

(57) ABSTRACT

In some implementations, the techniques described herein relate to a system including: a base station; and a customer premises equipment (CPE) communicatively coupled to the base station via a wide area network (WAN) and to user equipment (UE) via a local area network (LAN). The CPE can transmit location requests to the UEs; receive location request responses from the UEs, wherein a given location request response in the location request responses includes a location and one or more measurement values generated by a respective UE; store the location request responses in a location database; identify highest accuracy location request responses for the UEs from the location request responses based on corresponding measurement values of the location request responses; compute a CPE location based on the highest accuracy location request responses, the CPE location including a latitude and longitude of the CPE; and transmit the CPE location to the base station.

20 Claims, 5 Drawing Sheets

(51) Int. Cl.
*G01S 19/39* (2010.01)
*H04W 64/00* (2009.01)

(58) Field of Classification Search
CPC ... H04W 72/563; H04W 88/12; H04W 88/08; H04W 72/0453; H04W 16/14; H04W 12/08; H04W 60/00; H04W 72/04; H04W 76/10; H04W 92/02; H04W 72/25; H04W 72/12; H04W 36/0061; H04W 36/0066; H04W 80/00; H04B 7/0626; H04B 7/0617; H04B 7/0452; H04B 17/336; H04B 7/0486; H04B 17/309; H04B 7/0408; H04B 7/0632; H04B 17/345; H04B 7/0413; H04B 17/328; H04B 7/0404; H04B 1/7083; G06N 3/045; G06N 3/006; G06N 3/08; G06N 3/126; G06N 5/01; G06N 3/0464; G06N 7/01; H04L 41/0806; H04L 43/0811; H04L 65/1016; H04L 63/101; H04L 43/0888; H04L 65/612; H04L 67/025; H04L 67/1021; H04L 41/0886; H04L 67/54; Y02D 30/70

See application file for complete search history.

(56) References Cited

U.S. PATENT DOCUMENTS

| | | | |
|---|---|---|---|
| 2013/0029686 A1* | 1/2013 | Moshfeghi | H04W 4/021 455/456.1 |
| 2018/0049150 A1* | 2/2018 | Chandwani | H04W 76/10 |
| 2024/0329184 A1* | 10/2024 | Famili | G01S 5/0284 |

* cited by examiner

| Source of Measurement | Timestamp of Measurement | MAC Address | Longitude | Latitude | RTSD Error | GDOP | Location Service Provider | Wi-Fi RSSI | Wi-Fi Accuracy | Fine Timing Measurement Distance |
|---|---|---|---|---|---|---|---|---|---|---|
| Cellular Network OTDOA | XXX | N/A | xxx | xxx | 5 | 1.8 | N/A | N/A | N/A | N/A |
| UE 1 | YYY | XX | yyy | yyy | N/A | N/A | GPS | XXX | 5 | 5 |
| UE 2 | ZZZ | YY | zzz | zzz | N/A | N/A | Network | YYY | 50 | 15 |
| ... | ... | ... | ... | ... | ... | ... | ... | ... | ... | ... |
| UE N | NNN | ZZ | nnn | nnn | N/A | N/A | Network | ZZZ | 10 | 25 |

FIG. 4

SYSTEM AND METHOD FOR GEOLOCATION IDENTIFICATION AND ACCURACY ASSESSMENT OF FIXED WIRELESS CPE ENDPOINTS

BACKGROUND INFORMATION

Customer premises equipment (CPE) refers to the networking equipment that is installed at a customer's premises, such as a home or business, to enable connectivity to the 5G network. CPE can include devices such as 5G modems, routers, and antennas, which are installed on the customer's property to facilitate wireless communication with the 5G network.

BRIEF DESCRIPTION OF THE DRAWINGS

FIG. 4 is a block diagram illustrating a CPE location database according to some of the disclosed embodiments.

DETAILED DESCRIPTION

Figure 1:
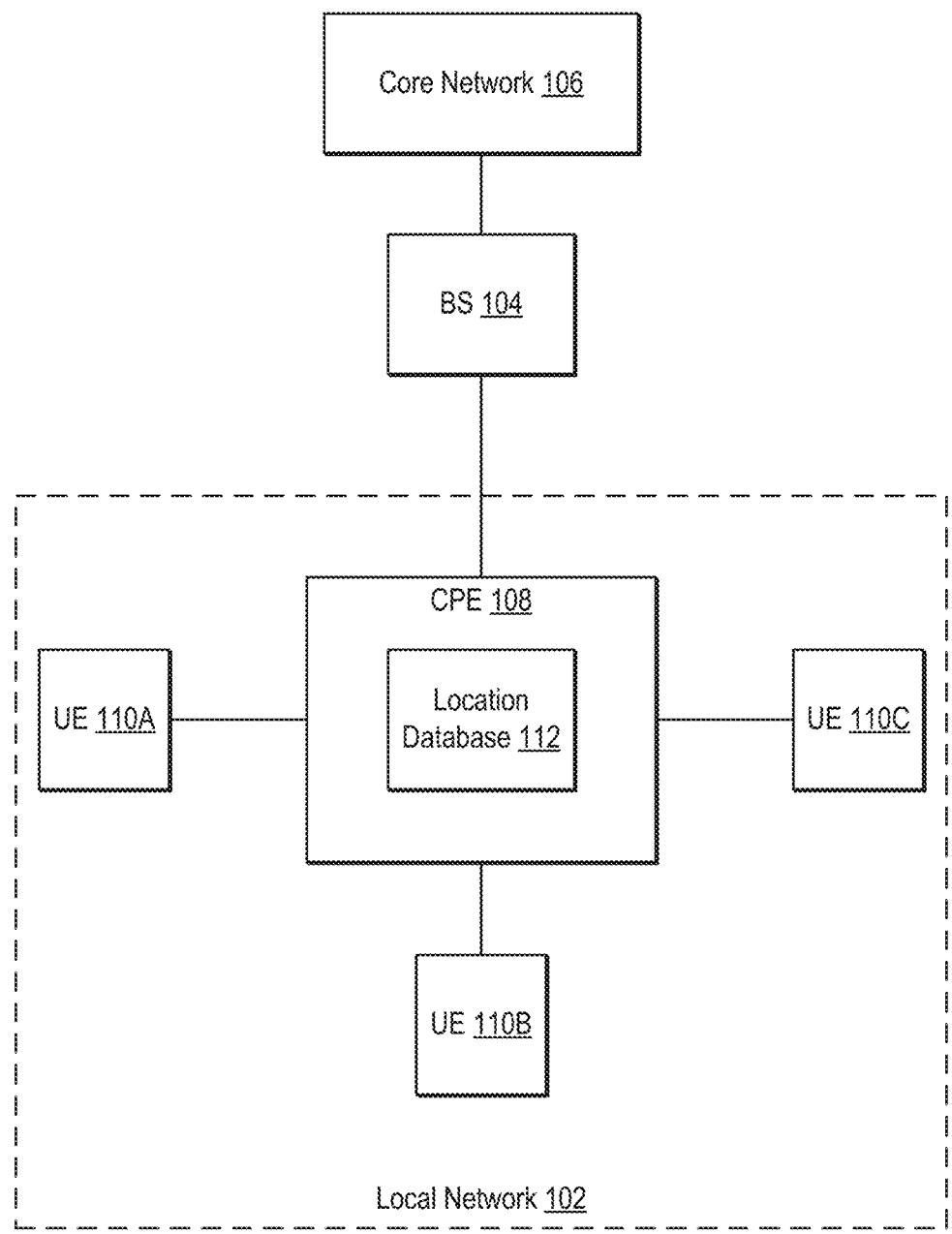
FIG. 1 is a block diagram illustrating a system for determining the location of a CPE according to some of the disclosed embodiments.

Many cellular networks employ CPEs to provide wide-area network (WAN) access to customers. CPEs may be deployed in a fixed nature (e.g., a home network access point) or non-stationary manner (e.g., within a vehicle). A CPE generally includes a cellular radio and wireless radio (e.g., wireless fidelity, or Wi-Fi, transceiver). Such a CPE thus provides a WAN connection via the cellular radio and local area network (LAN) connection via the wireless radio. Such a CPE, however, generally has reduced hardware complexity. As such, most CPE does not include more sophisticated hardware including global positioning system (GPS) receivers. Such a design decision is driven by a range of factors including small form factors, cost considerations, and power requirements, among others.

By reducing the complexity of CPEs by removing GPS receivers, such devices generally are not capable of being reliably located. However, the location of CPEs may be critical for improving the performance and security of a cellular network. For example, a mobile network operator (MNO) may place geographic restraints on CPEs (e.g., only allowing access when a CPE is within a geofenced location) which cannot be enforced using current CPEs that lack a GPS receiver. As another example, an MNO may tune a cellular radio based on the positioning of the CPE relative to a radio access network (RAN) which cannot be achieved using current CPEs that lack a GPS receiver. Thus, the lack of location-determination circuitry in current CPEs represents a technical problem in the current state of CPEs in a cellular network.

The example embodiments solve this technical problem and others without requiring the installation of location-determination circuitry within CPEs. The example embodiments thus allow for location-based functionality for a CPE while still maintaining the lower complexity of CPE.

The disclosed embodiments solve these and other problems in the art by providing methods, devices, systems, and computer-readable media for allowing a CPE to self-determine its location based on reports from UEs connected to the CPE via, for example, a wireless network. As used herein, a UE refers to a device communicatively coupled to a CPE via, for example, a wireless (e.g., Wi-Fi) link. The CPE periodically receives locations, from a base station or other cellular network components, that are computed based on the wireless connection (e.g., 4G or 5G) between the CPE and the cellular network. The CPE further identifies UEs on a local area network coupled to the CPE and then transmits location requests to each device to receive UE locations. Each UE can utilize a GPS or other technology to identify its location. The CPE can aggregate data over a period of time and then select, for each UE, a most accurate location based on, for example, the number of GPS satellites used, round trip time (RTT), fine time measurement (FTM), etc. Then, using the UE locations having the highest accuracy, the CPE can compute its own location using the UE locations. The CPE can then report back its self-determined location to the cellular network via, for example, the base station. In response, the cellular network can use the CPE-confirmed location to enable or disable services, improve RAN parameters for the CPE, or perform other location-based and automated actions. For example, a cellular network may allow operations of a CPE in a given geofenced location (e.g., a house or neighborhood). Using the methods described herein, the core network can determine if a subscriber has relocated the CPE to a location outside the allowed, geofenced region (e.g., to a different house) and can disable voice and/or data communications upon detecting this unauthorized change in location. Alternatively, the core network can utilize multiple authorized geofenced areas. In this scenario, the CPE may be authorized in multiple geofenced regions (e.g., multiple houses). Upon detecting a relocation of the CPE to another authorized area, the core network may maintain access to voice and/or data services. Such automated actions based on geofencing are currently not possible given the current design of CPEs.

In some implementations, the techniques described herein relate to a method for geo-locating a CPE based on UE-reported locations. The method can include the CPE transmitting location requests to the UEs over a LAN and receiving location request responses from the UEs, wherein a given location request response in the location request responses includes a location and one or more measurement values generated by a respective UE. The CPE then stores the location request responses in a location database and periodically identifies highest accuracy location request responses for the UEs from the location request responses based on corresponding measurement values of the location request responses. With these highest accuracy location request responses, the CPE computes its location based on the highest accuracy location request responses and transmits its location to a base station of a cellular network.

In some implementations, the CPE broadcasts the locations requests to the UEs and includes an Internet Protocol (IP) or Media Access Control (MAC) address of a given UE in the UEs in the broadcast. In some implementations, the CPE receives a latitude and longitude of each of the UEs in response. In some implementations, the CPE receives measurement values from the UEs which include one or more of a number of global positioning system (GPS) satellites used by a respective UE to determine its location and a round-trip time (RTT) representing a propagation time between the respective UE and the CPE. In some implementations, the measurement values further include one or more of a Received Signal Strength Indicator (RSSI) and a fine time measurement (FTM) reported by the UEs. In some implementations, the CPE computes distances of the UEs from the CPE using the highest accuracy location request responses and determining the CPE location based on the distances. In some implementations, the CPE can further be configured to receive a second location of the CPE from a cellular network, the second location computed using an Observed Time Difference of Arrival (OTDOA) value generated by the base station and store the second location in the location database as a location request response.

FIG. 1 is a block diagram illustrating a system for determining the location of a CPE according to some of the disclosed embodiments.

In the illustrated embodiment, a local network 102 is communicatively coupled to a core network 106 via a base station (BS 104). As illustrated, the local network 102 may include CPE 108 storing a location database 112. The CPE 108 can be communicatively coupled to UEs (e.g., UE 110A, UE 110B, UE 110C) via a local area network such as a wireless fidelity (Wi-Fi) network or similar type of networking technology.

In an implementation, BS 104 and core network 106 may form a cellular network such as a 4G or 5G cellular network. BS 104, also known as a cell site or base transceiver station (BTS), is a fixed point of communication responsible for connecting devices to the cellular network. Although one BS 104 is illustrated, the cellular network may employ multiple such base stations. In some implementations, BS 104 may comprise an eNodeB or gNodeB of a 4G or 5G network, respectively. BS 104 can encompass a specific geographic area known as a cell, within which it can provide radio coverage. BS 104 can include transceivers to send and receive radio signals, an antenna for signal propagation, and a controller to manage resources and coordinate with other components of the network. Advanced functionalities may be integrated into BS 104, including adaptive beamforming, multiple-input multiple-output (MIMO) technology, and carrier aggregation to enhance network performance, reliability, and capacity. BS 104 may further be configured to determine the location of attached devices (e.g., CPE 108) as described more fully in the description of FIG. 2.

Core network 106 serves as the backbone of the cellular network, facilitating the routing of voice and data traffic between different base stations, and between the cellular network and other networks such as the internet or other cellular systems. This involves various subcomponents including a Mobility Management Entity (MME), Access and Mobility Management Function (AMF), Serving Gateway (S-GW), Session Management Function (SMF), Packet Data Network Gateway (P-GW), User Plane Function (UPF), and Network Repository Function (NRF). Core network 106 may also support advanced network functionalities such as network slicing and network function virtualization, enabling the provision of differentiated services and operational efficiencies.

As illustrated, local network 102 can communicate with the cellular network via BS 104. The local network 102 includes CPE 108 that facilitates such communication. In some implementations, CPE 108 can include a computing device that includes one or more network interfaces. In some implementations, CPE 108 can include a WAN interface for connecting to BS 104. In some implementations, CPE 108 can further include a LAN interface for connecting to UE 110A, UE 110B, and UE 110C and other UEs (not illustrated). In some implementations, the WAN interface may be a cellular radio or other type of transceiver device. In some implementations, the LAN interface may include a Wi-Fi interface. Thus, CPE 108 may provide local network functionality to UE 110A, UE 110B, and UE 110C. In some implementations, CPE 108 may include additional interfaces such as a wired Ethernet interface, Bluetooth personal area network (PAN) interface, etc. The specific type of number of interfaces is not limiting and generally any combination of interface may be used.

In some implementations, CPE 108 can provide additional functionality beyond mere network connectivity. For example, CPE 108 may be implemented as a set-top box, modem/router, or other type of fixed wireless equipment. In general, CPE 108 may comprise a general-purpose computing device (similar to that depicted in FIG. 5) that can perform various functions within local network 102. Notably, however, CPE 108 may not include all hardware illustrated in FIG. 5. Specifically, CPE 108 may not include a GPS receiver or other type of location-determining circuitry. Thus, CPE 108 may not be capable of independently identifying its position. As discussed, As illustrated, CPE 108 includes a location database 112. One example of a schema used by location database 112 is described in connection with FIG. 4 and is not repeated herein. In some implementations, CPE 108 can periodically receive its location from BS 104 (as discussed more fully in FIG. 2) and can store this location in location database 112. Further, CPE 108 can periodically request location data from UE 110A, UE 110B, and UE 110C and store these locations in location database 112. Thus, CPE 108 can manage various locations within location database 112 and can use these reported locations to self-determine its own location. Specifically, as will be discussed in connection with FIG. 3, CPE 108 can analyze the received locations to filter highly accurate locations of UE 110A, UE 110B, and UE 110C and uses these filtered locations to triangulate its own location. CPE 108 can further report this position to BS 104 and core network 106. In response, BS 104 and core network 106 can adjust the cellular network based on the position of the CPE 108. For example, core network 106 and/or BS 104 may adjust the radio properties of CPE 108 or the timing properties of the radio interface of CPE 108 to improve the performance of CPE 108 based on its reported location. Alternatively, or in conjunction with the foregoing, BS 104 and/or core network 106 can allow or disallow access to services based on the location of CPE 108. For example, CPE 108 may only be allowed data connectivity if it is located within a geofenced region. In response to the reported location, BS 104 and/or core network 106 can determine if the location is within this geofenced region. If not, BS 104 and/or core network 106 can disallow data sessions between the CPE 108 and BS 104 and core network 106.

Figure 2:
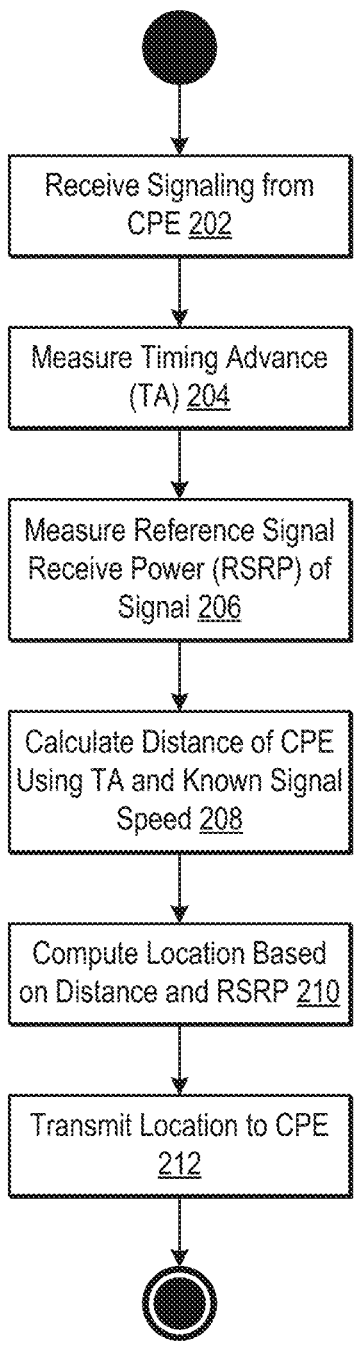
FIG. 2 is a flow diagram illustrating a method for determining a location of CPE using a cellular base station according to some of the disclosed embodiments.
Figure 3:
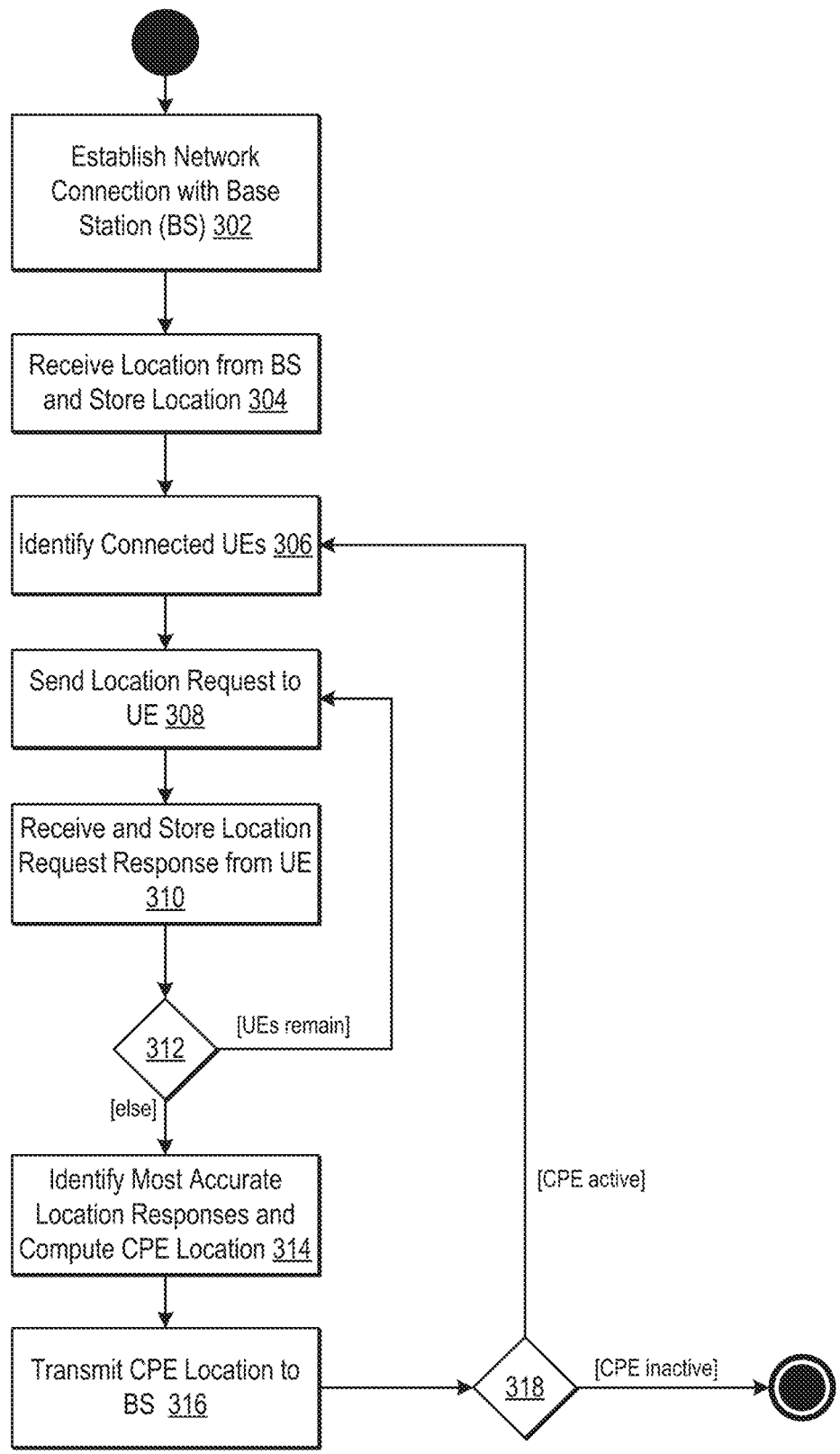
FIG. 3 is a flow diagram illustrating a method for self-determining a location of CPE according to some of the disclosed embodiments.

The operations of BS 104, CPE 108, UE 110A, UE 110B, and UE 110C are described more fully in connection with respect to FIGS. 2 and 3. Specifically, FIG. 2 describes a method performed by BS 104 while FIG. 3 describes a method performed by CPE 108, UE 110A, UE 110B, and UE 110C.

FIG. 2 is a flow diagram illustrating a method for determining a location of CPE using a cellular base station according to some of the disclosed embodiments.

In step 202, the method can include receiving signaling from a CPE and, in step 204, measures a timing advance (TA) of the CPE based on that signaling.

After receiving signaling from the CPE, the BS can measure the TA of the signal to estimate the distance between itself and the CPE. The TA is the time difference between when the BS sends a signal and when the CPE receives it, accounting for any propagation delays in the wireless channel. The TA can be measured using the uplink reference signal (ULRS) transmitted by the CPE, which is a sequence of symbols that can be used to synchronize the timing of the gNB and CPE. To measure the TA, the BS can correlate the ULRS signal received from the CPE with the expected sequence of symbols. The correlation can be performed using digital signal processing techniques, such as matched filtering, that compare the received signal with the expected sequence. The time delay between the received signal and the expected sequence can then be used to estimate the TA.

In step 206, the method can include measuring the reference signal receive power (RSRP) of the signaling.

To measure the RSRP, the BS may receive a reference signal from the CPE, such as the cell-specific reference signal (CRS), which is a signal transmitted by the BS that provides a reference for signal quality measurement. The BS can then measure the power level of the received signal using a power detector or other measurement technique. The RSRP is typically reported in decibels relative to a milliwatt (dBm) or a specified reference power level.

In step 208, the method can include calculating a distance of the CPE using the TA and a known signal speed. The estimated distance can be used to determine a circle around the BS that represents all possible locations of the CPE. To calculate the estimated distance, the BS can use the following equation:

$$d = \frac{c * TA}{2 * T_s},$$

where d is the estimated distance, c is the speed of light, TA is the timing advance measured in step 204, and $T_s$ is the sampling time (i.e., the time between the BS sending a signal and the CP receiving it).

In step 210, the method can include computing a location of the CPE based on the distance computed in step 208 and the RSRP measured in step 206. The estimated location is typically expressed in terms of latitude and longitude coordinates or in reference to a known point.

To compute the estimated location, the BS can use mathematical models that take into account the path loss, shadowing, and other factors that affect the signal strength between the BS and the CPE. These models can use the estimated distance and the RSRP to determine a range of possible locations for the CPE within the circle around the BS. The BS can then select the point within the range of possible locations that best matches the reported RSRP. This can be done using a variety of techniques, such as maximum likelihood estimation, Kalman filtering, or pattern recognition. The exact method used depends on the specific mathematical model being used for the location estimation process.

In step 212, the method can include transmitting the location computed in step 210 to the CPE. In some implementations, discussed below, the CPE can establish a network connection, such as an administrative packet data network (APDN), with the BS and the BS may periodically transmit location data (latitude and longitude) as well as measured parameters (discussed below) used to generate the latitude and longitude.

FIG. 3 is a flow diagram illustrating a method for self-determining a location of CPE according to some of the disclosed embodiments.

In step 302, the method can include establishing a network connection with the base station (BS).

In some implementations, the CPE can negotiate the network connection with a BS or other cellular element. In general, the network connection comprises a data network that is primarily used to manage, control, and maintain the operations of a CPE. For example, the network connection may comprise an APDN or similar type of data network connection. The network connection can be a subset or a parallel network to the main network and dedicated to network management tasks. The network connection may be secured from unauthorized access and may only be accessible by administrative users or accounts. In some implementations, the CPE can establish the network connection upon start up and the network connection may be persistent for the uptime of the CPE. In other implementations, the network connection may be brought up and torn down as needed, for example, for the duration of the method of FIG. 3. In some implementations, the CPE may authenticate to the cellular network to establish the network connection.

In step 304, the method can include receiving a location from the BS and storing the location in a location database.

As discussed in FIG. 2, a BS may compute a location of the CPE based on network signaling between the CPE and the BS. In some implementations, this location can comprise a latitude and longitude. In some implementations, the location can further include an elevation. In some implementations, the location can also include various additional measurements used by the BS to compute a location. For example, the round-trip time (RTT) used during the method of FIG. 2 may be included in the location data. As another example, an Observed Time Difference of Arrival (OTDOA) value determined by the BS or the core network can be included in the location data transmitted by the BS to the CPE. As yet another example, the Reference Signal Received Power (RSRP) and/or Effective Radiated Power Emission (ERPE) may also be transmitted by the BS to the CPE as part of the location data. In some implementations, the CPE can record the measured RSRP itself rather than receive the RSRP from the base station.

The CPE can receive this location data (e.g., latitude and longitude and measured values such as RSRP, OTDOA, etc.) periodically and write records to the location database as they are received. As will be discussed, the measured values can be used to select the most accurate location received from the BS. As such, the method of FIG. 3 may be executed over a period of time wherein these locations from the BS (as well as the UE locations, described next) are accumulated. This period of time may be adjustable (e.g., one hour, one day, etc.) based on the needs of the cellular network.

In step 306, the method can include identifying connected UEs.

In some implementations, the CPE can query a LAN to identify all connected computing devices. In some implementations, the CPE can maintain a list of such devices as part of providing routing functions to the LAN. In other implementations, the CPE can perform a network scan or map to obtain a list of Internet Protocol (IP) and/or Media Access Control (MAC) addresses of devices connected to the LAN. In some implementations, the CPE can perform this operation on multiple network interfaces (e.g., Wi-fi, Ethernet, PAN, etc.).

In step 308, the method can include selecting an identified UE and sending a location request to the UE.

After identifying a list of connected UEs, the method iterates through the list, selecting each UE. In step 308, for each identified UE, the CPE can transmit a location request to the identified UE. In some implementations, the CPE can transmit a network message to the identified UE. In some implementations, the CPE can transmit the network message to the identified IP or MAC address of the identified UE. In some implementations, the UEs may natively be capable of responding to location requests. In other implementations, the UEs may be equipped with a dedicated application or daemon that can respond to such location requests.

In some implementations, the CPE can broadcast a message to the entire network. In these implementations, the CPE can include the IP or MAC address of the identified UE in the broadcast message. For example, the CPE may transmit a message using a User Datagram Protocol (UDP) to transmit such a message.

In another implementation, the CPE may transmit a message directly to the identified UE using the IP or MAC address. For example, the CPE may utilize a protocol such as Internet Control Message Protocol (ICMP) that allows for direct addressing of devices on a network. In this scenario, the CPE may transmit the location request directly to the identified UE.

In yet another implementation, the method of FIG. 3 may be modified to support a general broadcast of a location request. In this implementation, the method may not send a request to a single device (either directly or via broadcast) but may instead issue a broadcast message requesting all devices report location data. Such a broadcast may also use a protocol such as UDP but may instead simply indicate that any device that is capable of responding respond. In this scenario, step 308 may be replaced with such a broadcast step and step 312 may be omitted.

In step 310, the method can include receiving and storing location request responses from the UE.

In some implementations, the identified UE can receive or otherwise detect a location request directed to the identified UE. In some implementations, the identified UE may include a GPS receiver or similar type of locating circuitry. In some implementations, the identified UE may alternatively be capable of determining its location using network-based mechanisms such as triangulation or other techniques that leverage network infrastructure.

In response to a location request, the identified UE may determine its location (e.g., via GPS or via network means). The identified UE may further determine other measurements related to the determination of a location. For example, the identified UE may determine the accuracy of the location determination means. As another example, the identified UE may determine the number of GPS satellites discoverable by the device. As another example, the identified UE may calculate the RTT between itself and the CPE. As yet another example, the identified UE may measure the Received Signal Strength Indicator (RSSI) of the connection to the CPE.

In some implementations, the identified UE can build a location request response that includes the determine location (e.g., latitude, longitude, elevation) as well as any and all relevant measured parameters (e.g., RSSI, RTT, number of GPS satellites, GPS accuracy, etc.). Further examples of measured parameters are provided in FIG. 4. In some implementations, the identified UE can build the response and issue a network response to the CPE that includes the location and measured values.

In some implementations, the CPE can also augment a location request response with a fine time measurement (FTM) value for the identified UE. Wi-Fi FTM is a feature introduced in the IEEE 802.11mc standard that allows for highly accurate indoor positioning using Wi-Fi signals. FTM works by measuring the RTT of Wi-Fi signals between a mobile device and one or more access points (e.g., CPE) in a given location. In some implementations, at time $t_1$ CPE may transmit a ping to the identified UE which is received by the UE at time $t_2$. In response, at time $t_3$ the identified UE transmit an acknowledgement response which is received by the CPE at time $t_4$. Using these four measured times, the distance of a UE to CPE can be computed as:

$$d = \frac{((t_4 - t_1) - (t_3 - t_2)) * c}{2},$$

where c represents the speed of light and d represents the distance of the identified UE from the CPE.

When the CPE receives a response, it can extract the IP and/or MAC address of the device transmitting the location request response. The CPE can then write the IP/MAC address, location (e.g., latitude, longitude, elevation), and measured values (e.g., RSSI, RTT, number of GPS satellites, GPS accuracy, etc.) to a location database. In some implementations, this location database is the same database that the BS-reported location and measured data is stored in.

In some implementations, the CPE can timestamp each of the received location request responses prior to writing the responses to the location database. In some implementations, the use of timestamps can be used to periodically flush the database as well as sort or order records within the database.

In step 312, the method can include determining if an UEs remain. If so, the method proceeds execute step 308 and step 310. If not, the method proceeds to step 314.

In step 314, the method can include identifying the most accurate location responses for the UEs and then computing the CPE location using the most accurate locations of the connected UEs.

As discussed above, the CPE can receive multiple location request responses from UEs connected to the LAN. The CPE may receive multiple responses from each identified UE, thus resulting in multiple records for any given UE. Further, the BS may periodically transmit its own location to the CPE, thus generating multiple locations reported by the BS. In some implementations, the method of FIG. 3 may be executed for a period of time, accumulating multiple locations from each source. As such, in step 314, the method filters the locations to identify a most accurate location for each reporting device (i.e., BS or UE).

As a first sub-step, the method can include filtering the BS-reported locations to identify the most accurate BS-reported location. In some implementations, OTDOA data received from a BS may include measurement data which may include the reference signal time difference (RSTD) error and geometrical dilution of precision (GDOP). In some implementations, the accuracy of an OTDOA measurement can be computed by multiplying the RSTD error by the GDOP. Each OTDOA location report can then be sorted by this accuracy and the most accurate OTDOA location report can be used as the BS-reported location. In other scenarios, other measurement values can be used to filter BS-reported locations. For example, the RSRP and ERPE associated with BS-reported location data can be used to assess the accuracy of the BS-reported location. Further, in other embodiments, the RTT can be used as a measure of accuracy.

As a second sub-step, the method can, for each identified UE, select a most accurate location request response. As discussed above, in some implementations, the identified UEs can report an accuracy of measurement along with an RSSI and other measured values. In some implementations, the CPE can use these measured values to assign an accuracy to each location request response. For example, the CPE can weight GPS-derived location data higher than network-derived location data. Further, CPE can normalize Wi-Fi accuracy (e.g., as computed using RSSI or RTT) and use this accuracy as a weight factor in the overall accuracy of the records. Further, in some implementations, when FTM measurements are received these can further be used to select the most accurate location request response. The specific implementation of weighting measured values is not limiting and various permutations of weighting underlying measurements may be used.

After the second sub-step, the CPE may obtain a most accurate BS-determined location and a set of most accurate UE locations. The CPE may then process each record to compute the distance of each measurement from the CPE. In some implementations, the CPE can compute a distance for a given device (x) using the following formula:

$$dist_x = 10 \wedge (PL_x + 147.5 - 20 * \log_{10}(freq_x * 10 \wedge 6))/20) * 3.28$$

Here, $PL_x$ can be computed by subtracting the RSSI for device x from the power transmitted by the CPE, thus representing the path loss between device x and the CPE. Further, the value of $freq_x$ can represent the wireless transmission frequency (in MHz) used between the two devices. The foregoing equation thus converts the path loss for a given frequency into an estimated distance (in meters) for each record.

After obtaining distances to each device filtered using the foregoing steps, the method can include solving the following set of linear equations:

$$(x - a_1)^2 + (y - b_1)^2 = dist_1^2$$
$$(x - a_2)^2 + (y - b_2)^2 = dist_2^2$$
$$(x - a_n)^2 + (y - b_n)^2 = dist_n^2$$

Here, x and y represent the latitude and longitude of the CPE while $a_n$ and $b_n$ represent the reported latitude and longitude of each of the devices (BS and UEs). The values of $dist_n$ comprise the computed distances as discussed above. By solving these equations using the highest accuracy measurements provided by the UEs and BS, the CPE can thus self-determine its own location.

In some implementations, the method may perform the above steps without utilizing the BS locations. That is, the method may compute distances and then solve the series of equations solely using the UE-reported data. In this implementation, the method can then compare the location generated using UE-reported data with the most accurate BS-reported data to determine if the location generated using UE-reported data is more or less accurate than the BS-reported location.

In step 316, the method can include transmitting the self-determined CPE location to the BS. In some implementations, the method can transmit the self-determined CPE location using the network connection (e.g., APDN) as described above. In step 318, the method can include determining if the CPE is still active. If so, the method can return to step 306 and re-execute the foregoing steps to continuously update the location database and self-determine the CPE location. If, on the other hand, the CPE is no longer active, the method may terminate.

In some implementations, the BS can use the CPE location to adjust one or more parameters of a network interface (e.g., radio interface) the CPE. For example, the BS can transmit an updated radio profile to the CPE that adjusts the parameters of the radio of the CPE. In some implementations, this profile can adjust parameters of the CPE such as frequency bands, channel bandwidth, beamforming, MIMO configuration, carrier aggregation, etc. Further, in some implementations, the parameters can enable or disable the radio interface. In some implementations, the parameters may modify the operation of the LAN interface.

FIG. 4 is a block diagram illustrating a CPE location database according to some of the disclosed embodiments.

In the illustrated embodiment, the database includes various columns 402 of measured data. Further, the database includes multiple rows for each measurement taken by the CPE. Some measurements may correspond to the location determined by a cellular network (e.g., BS) as illustrated by row 404. Other rows may correspond to location request responses received from UEs connected to the CPE (e.g., row 406).

The specific columns in various columns 402 are not limiting and more or fewer columns may be used. Each record includes a "source" of the measurement (e.g., BS or UE) as well as a timestamp used to manage the data as described previously. Further, location request responses from UEs may include a MAC address (or IP address) while location data from the BS may not include such data. Each record further includes a longitude and latitude value that is computed by the transmitting device using the methods of FIGS. 2 and 3. Finally, each row includes measurement data that can be used to rank the locations based on their predicted accuracy.

For example, a cellular network OTDOA location can be associated with an RSTD error (in meters) as well as a GDOP value (in meters). These values can be reported by the BS when transmitting the OTDOA location. Certainly, other metrics may be used. By contrast, local LAN UEs do not report an RSTD error or GDOP value but may rather provide a location service provide (e.g., GPS or network), an RSSI measurement, Wi-Fi accuracy measurement (in meters), as well as FTM measurement distances (in meters). As discussed, these values can then be used to rank the local UE-reported locations based on their predicted accuracy.

As illustrated, each of the reported locations can be stored in a table of other relational storage device. Alternatively, the reported locations can be stored in a non-relational database or storage device (e.g., NoSQL database, etc.). The CPE can periodically read records from this database according to the method of FIG. 3 and compute the accuracies of the records which can then be used to compute distances and the self-determined CPE location.

In some implementations, the CPE can maintain a last analyzed time and can only select data that occurs after the last analyzed time (using the timestamp value for each row). Further, in some implementations, the CPE can periodically remove stale data based on the same timestamp data to reduce the storage requirements of the database. Notably, the illustrated measurement values are not exhaustive and other measurement data (as described previously) can also be included in the database (e.g., the number of GPS satellites used, RTT, etc.).

Figure 5:
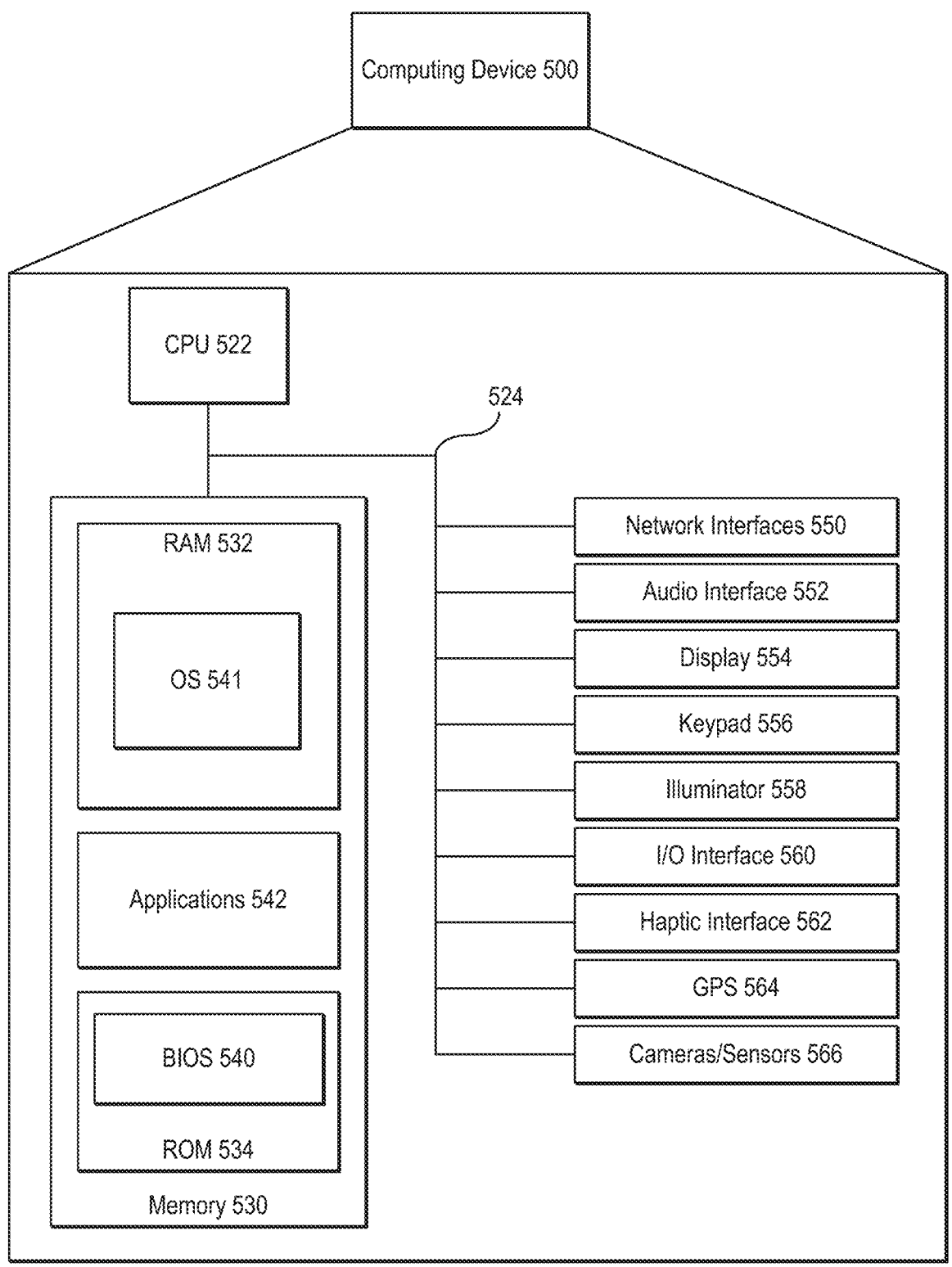
FIG. 5 is a block diagram illustrating a computing device showing an example of a client or server device used in the various embodiments of the disclosure.

FIG. 5 is a block diagram illustrating a computing device showing an example of a client or server device used in the various embodiments of the disclosure.

The computing device 500 can include more or fewer components than those shown in FIG. 5 depending on the deployment or usage of the computing device 500. Further, the computing device 500 may include multiple components of a same type (e.g., multiple network interfaces). For example, a server computing device, such as a rack-mounted server, may not include an audio interface 552, display 554, keypad 556, illuminator 558, haptic interface 562, GPS receiver 564, or sensor 566 (e.g., cameras or other optical, thermal, or electromagnetic sensors). As another example, a routing device may include multiple network interfaces (e.g., WAN interface and LAN interface). Some devices can include additional components not shown, such as graphics processing unit (GPU) devices, cryptographic co-processors, artificial intelligence (AI) accelerators, or other peripheral devices.

As shown in the figure, computing device 500 includes a central processing unit (CPU 522) in communication with a mass memory 530 via a bus 524. The computing device 500 also includes a network interface 550, an audio interface 552, a display 554, a keypad 556, an illuminator 558, an input/output interface 560, a haptic interface 562, a GPS receiver 564 and a sensor 566. The positioning of the sensor 566 on the computing device 500 can change per computing device 500 model, per computing device 500 capabilities, and the like, or some combination thereof.

In some embodiments, the CPU 522 can comprise a general-purpose CPU. The CPU 522 can comprise a single-core or multiple-core CPU. The CPU 522 can comprise a system-on-a-chip (SoC) or a similar embedded system. In some embodiments, a GPU can be used in place of, or in combination with, a CPU 522. Mass memory 530 can comprise a dynamic random-access memory (DRAM) device, a static random-access memory device (SRAM), or a Flash (e.g., NAND Flash) memory device. In some embodiments, mass memory 530 can comprise a combination of such memory types. In one embodiment, the bus 524 can comprise a Peripheral Component Interconnect Express (PCIe) bus. In some embodiments, the bus 524 can comprise multiple buses instead of a single bus.

Mass memory 530 illustrates another example of computer storage media for the storage of information such as computer-readable instructions, data structures, program modules, or other data. Mass memory 530 stores a basic input/output system (BIOS 540) for controlling the low-level operation of the computing device 500. In the illustrated embodiment, the BIOS 540 may be stored in a read-only memory (ROM) such as ROM 534. The mass memory also stores an operating system 541 for controlling the operation of the computing device 500.

Applications 542 can include computer-executable instructions which, when executed by the computing device 500, perform any of the methods (or portions of the methods) described previously in the description of the preceding figures. In some embodiments, the software or programs implementing the method embodiments can be read from a hard disk drive (not illustrated) and temporarily stored in RAM 532 by CPU 522. CPU 522 can then read the software or data from RAM 532, process them, and store them in RAM 532 again.

The computing device 500 can optionally communicate with a base station (not shown) or directly with another computing device. Network interface 550 is sometimes known as a transceiver, transceiving device, or network interface card (NIC).

The audio interface 552 produces and receives audio signals such as the sound of a human voice. For example, the audio interface 552 can be coupled to a speaker and microphone (not shown) to enable telecommunication with others or generate an audio acknowledgment for some action. Display 554 can be a liquid crystal display (LCD), gas plasma, light-emitting diode (LED), or any other type of display used with a computing device. Display 554 can also include a touch-sensitive screen arranged to receive input from an object such as a stylus or a digit from a human hand.

Keypad 556 can comprise any input device arranged to receive input from a user. Illuminator 558 can provide a status indication or provide light.

The computing device 500 also comprises an input/output interface 560 for communicating with external devices, using communication technologies, such as USB, infrared, Bluetooth®, or the like. The haptic interface 562 provides tactile feedback to a user of the client device.

The GPS receiver 564 can determine the physical coordinates of the computing device 500 on the surface of the Earth, which typically outputs a location as latitude and longitude values. GPS receiver 564 can also employ other geo-positioning mechanisms, including, but not limited to, triangulation, assisted GPS (AGPS), E-OTD, CI, SAI, ETA, BSS, or the like, to further determine the physical location of the computing device 500 on the surface of the Earth. In one embodiment, however, the computing device 500 can communicate through other components, providing other information that can be employed to determine the physical location of the device, including, for example, a MAC address, IP address, or the like.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to the desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product or software that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as read-only memory ("ROM"), random access memory ("RAM"), magnetic disk storage media, optical storage media, flash memory components, etc.

In this description, various functions and operations are described as being performed by or caused by computer instructions to simplify the description. However, those skilled in the art will recognize what is meant by such expressions is that the functions result from the execution of the computer instructions by one or more controllers or processors, such as a microprocessor. Alternatively, or in combination, the functions and operations can be implemented using special-purpose circuitry, with or without software instructions, such as using Application-Specific Integrated Circuit (ASIC) or Field-Programmable Gate Array (FPGA). Embodiments can be implemented using hardwired circuitry without software instructions or in combination with software instructions. Thus, the techniques are limited neither to any specific combination of hardware circuitry and software nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

We claim:

1. A system comprising:
a customer premises equipment (CPE) communicatively coupled to a base station of a cellular network and to one or more user equipment (UEs), the CPE configured to:
transmit location requests to the UEs;
receive location request responses from the UEs, wherein a given location request response in the location request responses includes a location and one or more measurement values generated by a respective UE;
store the location request responses in a location database;
identify highest accuracy location request responses for the UEs from the location request responses based on corresponding measurement values of the location request responses;
compute a CPE location based on the highest accuracy location request responses, the CPE location comprising a latitude and longitude of the CPE; and
transmit the CPE location to the base station.

2. The system of claim 1, wherein the base station is configured to adjust a parameter of a network interface of the CPE based on the CPE location.

3. The system of claim 1, wherein transmitting the location requests to the UEs comprises broadcasting the locations requests to the UEs, wherein each location request in the location requests includes one of an Internet Protocol (IP) or Media Access Control (MAC) address of a given UE in the UEs.

4. The system of claim 1, wherein receiving the location request responses from the UEs comprises receiving a latitude and longitude of each of the UEs.

5. The system of claim 1, wherein receiving the location request responses from the UEs comprises receiving measurement values from the UEs, the measurement values comprising one or more of a number of global positioning system (GPS) satellites used by a respective UE to determine its location and a round-trip time (RTT) representing a propagation time between the respective UE and the CPE.

6. The system of claim 4, wherein the measurement values further include one or more of a Received Signal Strength Indicator (RSSI) and a fine time measurement (FTM) reported by the UEs.

7. The system of claim 1, wherein computing the CPE location based on the highest accuracy location request responses comprises computing distances of the UEs from the CPE using the highest accuracy location request responses and determining the CPE location based on the distances.

8. The system of claim 7, where computing the CPE location based on the highest accuracy location request responses further comprises selecting a highest accuracy location request response for a given UE based one of RSSI or FTM measurements included in location request responses associated with the given UE.

9. The system of claim 8, wherein selecting a highest accuracy location request response for a given UE further comprises weighting location request responses associated with the given UE including GPS-derived locations higher than location request responses associated with the given UE including network-derived locations.

10. The system of claim 1, wherein the CPE is further configured to:
receive a second location of the CPE from a cellular network, the second location computed using an Observed Time Difference of Arrival (OTDOA) value generated by the base station; and
store the second location in the location database as a location request response.

11. A method comprising:
  transmitting, by a customer premises equipment (CPE), location requests to one or more user equipment (UEs) communicatively coupled to the CPE;
  receiving, by the CPE, location request responses from the UEs, wherein a given location request response in the location request responses includes a location and one or more measurement values generated by a respective UE;
  storing, by the CPE, the location request responses in a location database;
  identifying, by the CPE, highest accuracy location request responses for the UEs from the location request responses based on corresponding measurement values of the location request responses;
  computing, by the CPE, a CPE location based on the highest accuracy location request responses, the CPE location comprising a latitude and longitude of the CPE; and
  transmitting, by the CPE, the CPE location to a base station of a cellular network.

12. The method of claim 11, wherein transmitting the location requests to the UEs comprises broadcasting the locations requests to the UEs, wherein each location request in the location requests includes one of an Internet Protocol (IP) or Media Access Control (MAC) address of a given UE in the UEs.

13. The method of claim 11, wherein receiving the location request responses from the UEs comprises receiving a latitude and longitude of each of the UEs.

14. The method of claim 11, wherein receiving the location request responses from the UEs comprises receiving measurement values from the UEs, the measurement values comprising one or more of a number of global positioning system (GPS) satellites used by a respective UE to determine its location and a round-trip time (RTT) representing a propagation time between the respective UE and the CPE.

15. The method of claim 14, wherein the measurement values further include one or more of a Received Signal Strength Indicator (RSSI) and a fine time measurement (FTM) reported by the UEs.

16. The method of claim 11, wherein computing the CPE location based on the highest accuracy location request responses comprises computing distances of the UEs from the CPE using the highest accuracy location request responses and determining the CPE location based on the distances.

17. The method of claim 11, further comprising:
  receiving a second location of the CPE from a cellular network, the second location computed using an Observed Time Difference of Arrival (OTDOA) value generated by the base station; and
  storing the second location in the location database as a location request response.

18. A non-transitory computer-readable storage medium for tangibly storing computer program instructions capable of being executed by a computer processor, the computer program instructions defining steps of:
  transmitting, by a customer premises equipment (CPE), location requests to one or more user equipment (UEs) communicatively coupled to the CPE;
  receiving, by the CPE, location request responses from the UEs, wherein a given location request response in the location request responses includes a location and one or more measurement values generated by a respective UE;
  storing, by the CPE, the location request responses in a location database;
  identifying, by the CPE, highest accuracy location request responses for the UEs from the location request responses based on corresponding measurement values of the location request responses;
  computing, by the CPE, a CPE location based on the highest accuracy location request responses, the CPE location comprising a latitude and longitude of the CPE; and
  transmitting, by the CPE, the CPE location to a base station of a cellular network.

19. The non-transitory computer-readable storage medium of claim 18, wherein receiving the location request responses from the UEs comprises receiving measurement values from the UEs, the measurement values comprising one or more of a number of global positioning system (GPS) satellites used by a respective UE to determine its location and a round-trip time (RTT) representing a propagation time between the respective UE and the CPE.

20. The non-transitory computer-readable storage medium of claim 18, wherein computing the CPE location based on the highest accuracy location request responses comprises computing distances of the UEs from the CPE using the highest accuracy location request responses and determining the CPE location based on the distances.

\* \* \* \* \*